United States Patent
McCann et al.

(10) Patent No.: US 11,341,510 B2
(45) Date of Patent: *May 24, 2022

(54) DETERMINING CLIENT SYSTEM ATTRIBUTES

(71) Applicant: comScore, Inc., Reston, VA (US)

(72) Inventors: Patrick McCann, Great Falls, VA (US); Brian Pugh, Reston, VA (US); Cameron S. Meierhoefer, Washington, DC (US)

(73) Assignee: Comscore, Inc., Reston, VA (US)

( * ) Notice: Subject to any disclaimer, the term of this patent is extended or adjusted under 35 U.S.C. 154(b) by 299 days.

This patent is subject to a terminal disclaimer.

(21) Appl. No.: 15/700,173

(22) Filed: Sep. 10, 2017

(65) Prior Publication Data

US 2017/0372330 A1    Dec. 28, 2017

Related U.S. Application Data

(63) Continuation of application No. 12/879,568, filed on Sep. 10, 2010, now Pat. No. 9,767,464.

(60) Provisional application No. 61/241,576, filed on Sep. 11, 2009.

(51) Int. Cl.
   *G06F 15/173* (2006.01)
   *G06Q 30/02* (2012.01)

(52) U.S. Cl.
   CPC .................................. *G06Q 30/02* (2013.01)

(58) Field of Classification Search
   CPC .............................. G06Q 30/02; H04L 67/22
   USPC ................................ 705/7.32; 709/225, 224
   See application file for complete search history.

(56) References Cited

U.S. PATENT DOCUMENTS

| | | | | |
|---|---|---|---|---|
| 5,862,339 A | * | 1/1999 | Bonnaure | H04L 12/2856 709/217 |
| 6,192,403 B1 | * | 2/2001 | Jong | H04L 43/0817 709/223 |
| 6,330,566 B1 | * | 12/2001 | Durham | G06F 16/972 |
| 6,487,538 B1 | * | 11/2002 | Gupta | G06Q 30/02 705/14.66 |
| 7,260,837 B2 | | 8/2007 | Abraham et al. | |
| 2003/0115251 A1 | | 6/2003 | Fredrickson et al. | |
| 2004/0015715 A1 | | 1/2004 | Brown | |
| 2004/0019518 A1 | | 1/2004 | Abraham et al. | |
| 2004/0122939 A1 | | 6/2004 | Perkins | |

(Continued)

OTHER PUBLICATIONS

U.S. Appl. No. 61/175,941, filed May 2009, titled Determining Projection Weights Based on Census Data.

(Continued)

*Primary Examiner* — Liang Che A Wang
*Assistant Examiner* — Sherman Lin
(74) *Attorney, Agent, or Firm* — BakerHostetler

(57) ABSTRACT

Webpage or other resource accesses by client systems may be recorded, and those accesses may be analyzed to develop audience measurement reports. At times, it may be desirable to segment those reports according to classes of client systems (e.g., work vs. home client systems). A given client system can be classed into one of the reporting classes based on one or more classes of network service providers that provide the client with access to a network. The recorded resource accesses and classes of the client systems can then be used to generate audience measurement reports that are segmented according to one or more of the client system classes.

20 Claims, 5 Drawing Sheets

(56) References Cited

U.S. PATENT DOCUMENTS

| | | |
|---|---|---|
| 2006/0085667 A1 | 4/2006 | Kubota et al. |
| 2006/0271655 A1* | 11/2006 | Yoon .................. H04L 67/1008 709/223 |
| 2007/0276940 A1 | 11/2007 | Abraham et al. |
| 2008/0177590 A1 | 7/2008 | Brodsky et al. |
| 2010/0042622 A1* | 2/2010 | Matkowsky ........... G06Q 10/00 707/769 |
| 2010/0192207 A1* | 7/2010 | Raleigh ............... H04L 63/0428 726/6 |

OTHER PUBLICATIONS

PCT Notification of Transmittal of the International Search Report and Written Opinion, International Application No. PCT/US10/48433 dated Nov. 16, 2010, 10 pages.

\* cited by examiner

DETERMINING CLIENT SYSTEM ATTRIBUTES

CROSS REFERENCE TO RELATED APPLICATION

This application is a continuation of U.S. patent application Ser. No. 12/879,568, filed Sep. 10, 2010, and published as U.S. Patent App. Pub. No. 2011/0087780 on Apr. 14, 2011, which claims the benefit of U.S. Provisional Patent App. No. 61/241,576, filed Sep. 11, 2009, the disclosures of which are considered part of (and are incorporated by reference in) the disclosure of this application.

BACKGROUND

Internet audience measurement may be useful for a number of reasons. For example, some organizations may want to be able to make claims about the size and growth of their audiences or technologies. Similarly, understanding consumer behavior, such as how consumers interact with a particular web site or group of web sites, may help organizations make decisions that improve their traffic flow or the objective of their site. In addition, understanding Internet audience visitation and habits may be useful in supporting advertising planning, buying, and selling.

SUMMARY

In one general aspect, a system includes one or more processing devices and one or more storage devices storing instructions that, when executed by the one or more processing devices, cause the one or more processing devices to perform the following operations. A set of records is accessed. Each of the records indicates an identifier of a resource that has been accessed by a client system, a network address of the client system that accessed the resource, a time that the client system accessed the resource, and a unique identifier for the client system that accessed the resource. Each record in at least a portion of the accessed set of records is associated with one of multiple network access providers based on the network address included in the record. For each of the multiple network access providers, a determination is made as to whether the network access provider belongs to a home class or a work class based on the times included in the records associated with the network access provider. The unique identifiers in the records associated with a network access provider are associated with the home class or work class based on the determined home class or work class for the network access providers associated with the records that include the unique identifier. One or more reports are generated based on at least a portion of the records in the accessed set of records and the home class or work class associated with each unique identifier. The one or more reports include information regarding client system access of one or more of the resources. The information regarding client system access of one or more of the resources is segmented according to one or both of the home and work classes.

In another general aspect a system includes one or more processing devices, and one or more storage devices storing instructions that, when executed by the one or more processing devices, cause the one or more processing devices to perform the following operations. A set of records is accessed. Each of the records indicates an identifier of a resource that has been accessed by a client system over a network and a unique identifier for the client system that accessed the resource. One of multiple classes is determined for each unique identifier based on the accessed set of records. Each unique identifier is associated with the class determined for the unique identifier. One or more reports are generated based on at least a portion of the records included in the accessed set of records and the class associated with each unique identifier. The one or more reports include information regarding client system access of one or more of the resources. The information regarding client system access of one or more of the resources is segmented according to one or more of the multiple classes.

Implementations may include one or more of the following features. For example, each of the records may include a network address of the client system that accessed the resource and a time that the client system accessed the resource. Determining one of multiple classes for each unique identifier based on the accessed data may include determining one of multiple classes for each unique identifier based on the network addresses and the times indicated in the records that indicate unique identifiers.

Determining one of multiple classes for each unique identifier based on the network addresses and the times indicated in the records that indicate unique identifiers may include associating each record with one of multiple network access providers based on the network address included in the record. Determining one of multiple classes for each unique identifier based on the network addresses and the times indicated in the records that indicate unique identifiers may further include determining one of multiple classes for each network access provider based on the times included in the records associated with the network access provider. Determining one of multiple classes for each unique identifier based on the network addresses and the times indicated in the records that indicate unique identifiers may further include determining one of multiple classes for each unique identifier based on the classes determined for the network access providers associated with the records that indicate unique identifiers.

Determining one of multiple classes for each network access provider based on the times indicated in the records associated with the network access provider may include determining a first number of the records associated with the network access provider that include a time during a first time period. Determining one of multiple classes for each network access provider based on the times indicated in the records associated with the network access provider may further include determining a second number of the records associated with the network access provider that include a time during a second time period. Determining one of multiple classes for each network access provider based on the times indicated in the records associated with the network access provider may further include determining a ratio between the first number and the second number. Determining one of multiple classes for each network access provider based on the times indicated in the records associated with the network access provider may further include determining one of multiple classes for the network access provider based on the ratio.

The multiple classes may include a home class and a work class. The first time period may include an evening period and the second time period includes a daytime period.

Determining one of multiple classes for each unique identifier based on the classes determined for the network access providers associated with the records that indicate the unique identifier may determining that the records that indicate the unique identifier are associated with a single network access provider. Determining one of multiple classes for each unique identifier based on the classes determined for the network access providers associated with the records that indicate the unique identifier may further include associating the class determined for the single network with the unique identifier.

Determining one of multiple classes for each unique identifier based on the classes determined for the network access providers associated with the records that indicate the unique identifier may include determining that a first portion of the records that indicate a unique identifier are associated with a first network access provider with a first class and a second portion of the records that indicate the unique identifier are associated with a second network access provider with a second class. Determining one of multiple classes for each unique identifier based on the classes determined for the network access providers associated with the records that indicate the unique identifier may further include instructions determining whether a number of the records in the first portion exceeds a threshold. Determining one of multiple classes for each unique identifier based on the classes determined for the network access providers associated with the records that indicate the unique identifier may further include associating the unique identifier with the first class if the number of the records in the first portion exceeds the threshold. Determining one of multiple classes for each unique identifier based on the classes determined for the network access providers associated with the records that indicate the unique identifier may further include associating the unique identifier with the second class if the number of the records in the first portion does not exceed the threshold.

Determining one of multiple classes for each unique identifier based on the classes determined for the network access providers associated with the records that indicate the unique identifier may include determining an initial one of the multiple classes for a unique identifier based on the classes determined for the network access providers associated with the records that indicate the unique identifier. Determining one of multiple classes for each unique identifier based on the classes determined for the network access providers associated with the records that indicate the unique identifier may further include accessing one or more of the records that indicate the unique identifier. Determining one of multiple classes for each unique identifier based on the classes determined for the network access providers associated with the records that indicate the unique identifier may further include determining that the unique identifier belongs to a different one of the multiple classes based on an analysis of the accessed one or more records that indicate the unique identifier.

In another general aspect, a method includes accessing a set of records. Each of the records indicates an identifier of a resource that has been accessed by a client system over a network and a unique identifier for the client system that accessed the resource. The method also includes determining one of multiple classes for each unique identifier based on the accessed set of records and associating each unique identifier with the class determined for the unique identifier. In addition, the method includes generating one or more reports based on at least a portion of the records included in the accessed set of records and the class associated with each unique identifier. The one or more reports include information regarding client system access of one or more of the resources. The information regarding client system access of one or more of the resources is segmented according to one or more of the multiple classes.

Implementations may include one or more of the following features. For example, each of the records may include a network address of the client system that accessed the resource and a time that the client system accessed the resource. Determining one of multiple classes for each unique identifier based on the accessed data may include determining one of multiple classes for each unique identifier based on the network addresses and the times indicated in the records that indicate unique identifiers.

Determining one of multiple classes for each unique identifier based on the network addresses and the times indicated in the records that indicate unique identifiers may include associating each record with one of multiple network access providers based on the network address included in the record. Determining one of multiple classes for each unique identifier based on the network addresses and the times indicated in the records that indicate unique identifiers may further include determining one of multiple classes for each network access provider based on the times included in the records associated with the network access provider. Determining one of multiple classes for each unique identifier based on the network addresses and the times indicated in the records that indicate unique identifiers may further include determining one of multiple classes for each unique identifier based on the classes determined for the network access providers associated with the records that indicate unique identifiers.

Determining one of multiple classes for each network access provider based on the times indicated in the records associated with the network access provider may include determining a first number of the records associated with the network access provider that include a time during a first time period. Determining one of multiple classes for each network access provider based on the times indicated in the records associated with the network access provider may further include determining a second number of the records associated with the network access provider that include a time during a second time period. Determining one of multiple classes for each network access provider based on the times indicated in the records associated with the network access provider may further include determining a ratio between the first number and the second number. Determining one of multiple classes for each network access provider based on the times indicated in the records associated with the network access provider may further include determining one of multiple classes for the network access provider based on the ratio.

The multiple classes may include a home class and a work class. The first time period may include an evening period and the second time period includes a daytime period.

Determining one of multiple classes for each unique identifier based on the classes determined for the network access providers associated with the records that indicate the unique identifier may determining that the records that indicate the unique identifier are associated with a single network access provider. Determining one of multiple classes for each unique identifier based on the classes determined for the network access providers associated with the records that indicate the unique identifier may further include associating the class determined for the single network with the unique identifier.

Determining one of multiple classes for each unique identifier based on the classes determined for the network access providers associated with the records that indicate the unique identifier may include determining that a first portion of the records that indicate a unique identifier are associated with a first network access provider with a first class and a second portion of the records that indicate the unique identifier are associated with a second network access provider with a second class. Determining one of multiple classes for each unique identifier based on the classes determined for the network access providers associated with the records that indicate the unique identifier may further include instructions determining whether a number of the records in the first portion exceeds a threshold. Determining one of multiple classes for each unique identifier based on the classes determined for the network access providers associated with the records that indicate the unique identifier may further include associating the unique identifier with the first class if the number of the records in the first portion exceeds the threshold. Determining one of multiple classes for each unique identifier based on the classes determined for the network access providers associated with the records that indicate the unique identifier may further include associating the unique identifier with the second class if the number of the records in the first portion does not exceed the threshold.

Determining one of multiple classes for each unique identifier based on the classes determined for the network access providers associated with the records that indicate the unique identifier may include determining an initial one of the multiple classes for a unique identifier based on the classes determined for the network access providers associated with the records that indicate the unique identifier. Determining one of multiple classes for each unique identifier based on the classes determined for the network access providers associated with the records that indicate the unique identifier may further include accessing one or more of the records that indicate the unique identifier. Determining one of multiple classes for each unique identifier based on the classes determined for the network access providers associated with the records that indicate the unique identifier may further include determining that the unique identifier belongs to a different one of the multiple classes based on an analysis of the accessed one or more records that indicate the unique identifier.

Implementations of any of the described techniques may include a method or process, an apparatus, a device, a machine, a system, or instructions stored on a computer-readable storage device. The details of particular implementations are set forth in the accompanying drawings and description below. Other features will be apparent from the following description, including the drawings, and the claims.

DETAILED DESCRIPTION

In general, webpage or other resource accesses by client systems may be recorded, and those accesses may be analyzed to develop audience measurement reports. At times, it may be desirable to segment those reports according to classes of client systems (e.g., work vs. home client systems). A given client system can be classed into one of the reporting classes based on one or more classes of network service providers that provide the client with access to a network. The recorded resource accesses and classes of the client systems can then be used to generate audience measurement reports that are segmented according to one or more of the client system classes.

Figure 1:
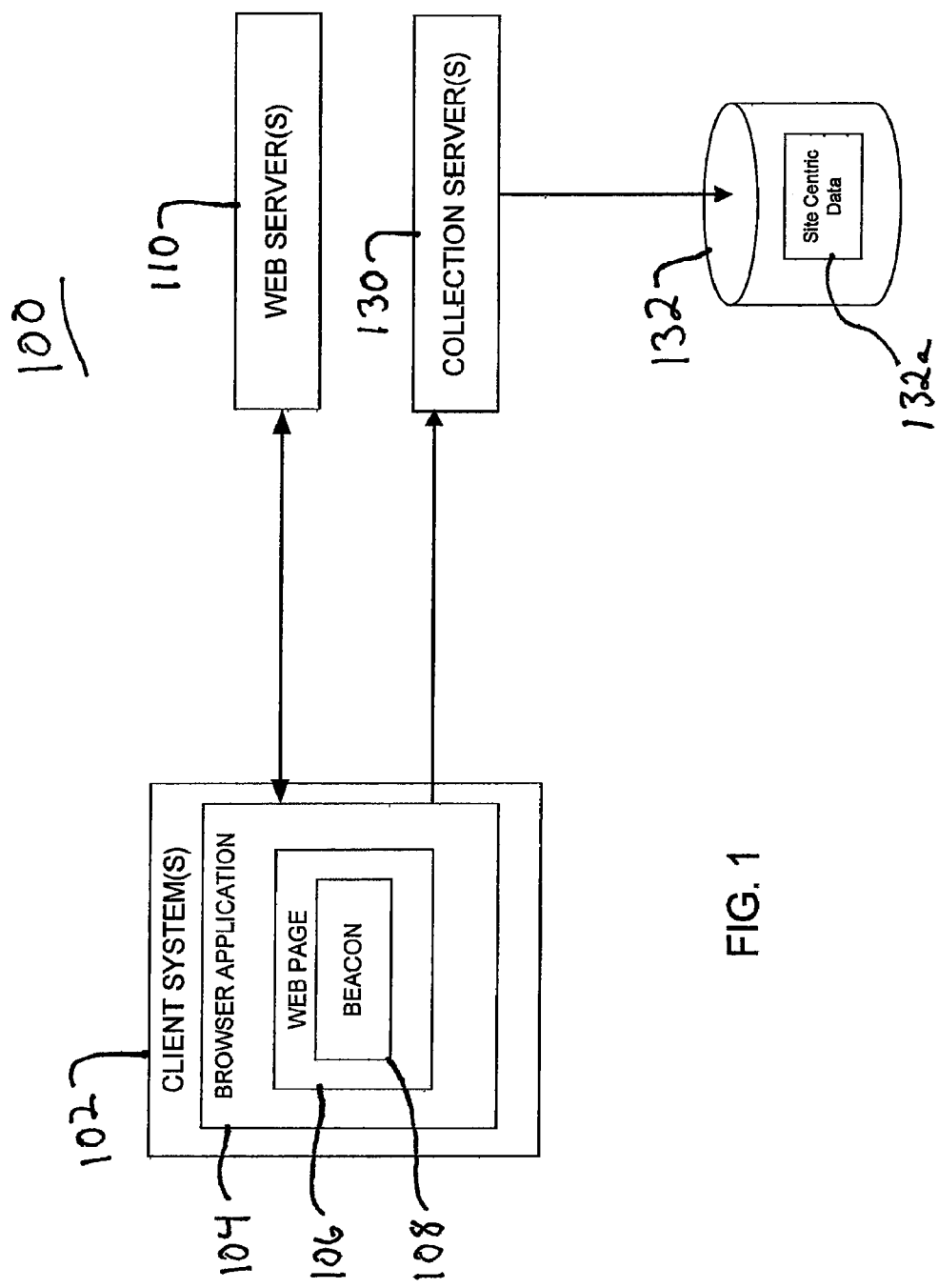
FIG. 1 illustrates an example of a system in which site access data can be obtained by including beacon code in one or more webpages.

Referring to FIG. 1, a system 100 includes one or more client systems 102, one or more web servers 110, one or more collection servers 130, and one or more databases 132. The client systems 102, collection server 130, and web servers 110 may communicate with one another over a network, such as the Internet, using various protocols, such as the HyperText Transfer Protocol (HTTP).

In general, users employ client systems 102 to access resources, such as webpages, located at the web servers 110. As described more fully below, some or all of the accessed resources include beacon code, which causes the client systems 102 to send information about these resource accesses to a collection server 130. This information may be used to understand the usage habits of the users of the network (e.g., the Internet).

While the example shown in FIG. 1 only depicts one client system 102, the system 100 may include any number of client systems. Similarly, while the example shown in FIG. 1 only depicts a single collection server 130, system 100 may include multiple collection servers 130. For example, each of multiple client systems 102 may send data to more than one collection server 130 for redundancy. In other implementations, the client systems 102 may send data to different collection servers 130. In this implementation, the data may be communicated to and aggregated at a central location for later processing. The central location may be one of the collection servers. Also, while only a single web server 110 is depicted, system 100 may include multiple web servers.

Each of the client systems 102, the collection servers 130, and the web servers 110 may be implemented using, for example, a general-purpose computer capable of responding to and executing instructions in a defined manner, a personal computer, a special-purpose computer, a workstation, a server, or a mobile device. Client systems 102, collection servers 130, and web servers 110 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 102, collection server 130, and web server 110.

The client systems 102 include a browser application 104 that retrieves webpages 106 from web servers 110 and renders the retrieved webpages 106. Some of the webpages 106 include beacon code 108. In general, publishers of webpages may agree with the entity operating the collection server 130 to include this beacon code in some or all of their webpages. This code 108 is rendered with the webpage 106 in which the code 108 is included. When rendered, the code 108 causes the browser application 104 to send a message to the collection server 130. This message includes certain information, such as the URL of the webpage 106 in which the beacon code 108 is included. For example, the beacon code may be JavaScript code that accesses the URL of the webpage on which the code is included, and sends to the collection server 130 an HTTP Post message that includes the URL in a query string. Similarly, the beacon code may be JavaScript code that accesses the URL of the webpage on which the code is included, and includes the accessed URL in the "src" attribute of an <img> tag, which results in a request for the resource located at the URL in the "src" attribute of the <img> tag being sent to the collection server 130. Because the URL of the webpage is included in the "src" attribute, the collection server 130 receives the URL of the webpage. The collection server 130 can then return a transparent image. The following is an example of such JavaScript:

```
<script type="text/javascript">
document.write("<img id='img1' height='1'
width='1'>");document.getElementById("img1").src="http://example.com/scripts/report.
dll?C7=" + escape(window.location.href) + "&rn=" +
Math.floor(Math.random( )*99999999);
</script>
```

The message may also include a unique identifier for the client system. For example, when a client system first sends a beacon message to the collection server 130, a unique identifier may be generated for the client system (and associated with the received beacon message). That unique identifier may then be included in a cookie that is set on that client system 102. As a result, later beacon messages from that client system may have the cookie appended to them such that the messages include the unique identifier for the client system.

Thus, as users of client systems 102 access webpages (e.g., on the Internet), the client systems 102 access the webpages that include the beacon code, which results in messages being sent to the collection server 130. These messages indicate the webpage that was accessed (e.g., by including the URL for the webpage) and a unique identifier for the client system that sent the message. When a message is received at the collection server 130, a record may be generated for the received message. The record may indicate an identifier (e.g., the URL) of the webpage accessed by the client system, the unique identifier for the client system, a time at which the client system accessed the webpage (e.g., by including a time stamp of when the message was received by the collection server 130), and a network address, such as an IP address, of the client system that accessed the webpage. The collection server 130 may then aggregate these records and store the aggregated records in the database 132 as site access data 132a.

Reports can be generated from the aggregated records. For example, this data may be used to estimate the number of unique visitors visiting certain webpages or groups of webpages. This data may also be used to determine other estimates, such as the frequency of usage per client system and average number of pages viewed per client system.

In certain situations, it may be desirable to segment such reports according to a class of the client system. For example, publishers and advertisers may want to see such reports segmented according to the traffic that can be attributed to client systems used primarily for home use and the traffic that can be attributed to client systems used primarily for business reasons.

As described further below, implementations may identify these two subpopulations (or other additional or alternative subpopulations) based on the aggregated records. For example, the records may be analyzed to determine a class for the network access provider that provides access to the network for a given client system (as represented in the records by the unique identifier for the client system). The network access provider may be, for example, an Internet Service Provider (ISP) or an organization such as a business. The class of the network access provider(s) then may be used to classify the client system. As a further example, analysis of behaviors that can be detected in the records for a given client system may be used additionally, or alternatively, to the class of the network access provider in determining a class for the client system.

Once the client systems are classified, the records can then be segmented into the subpopulations and used to generate reports being segmented into one or more of these classes. For example, a report may be generated that indicates the unique home client systems that have accessed a certain webpage or webpages over a period time. Similarly, a report may be generated that indicates the unique work client systems that have accessed the same webpage or group of webpages over the same or different time period. A report may be generated that shows both home and work accesses, separated according to the categories.

Also, it may be desirable to exclude certain classes of client systems from the reports. For instance, publishers and advertisers may not want shared use clients systems (e.g., those in libraries or "cyber-cafes") to be included in the reports. In this case, the records for those client systems may be excluded by classifying those client systems appropriately. Alternative, or additionally, it may be useful to generate reports segmented by shared use client systems.

Figure 2:
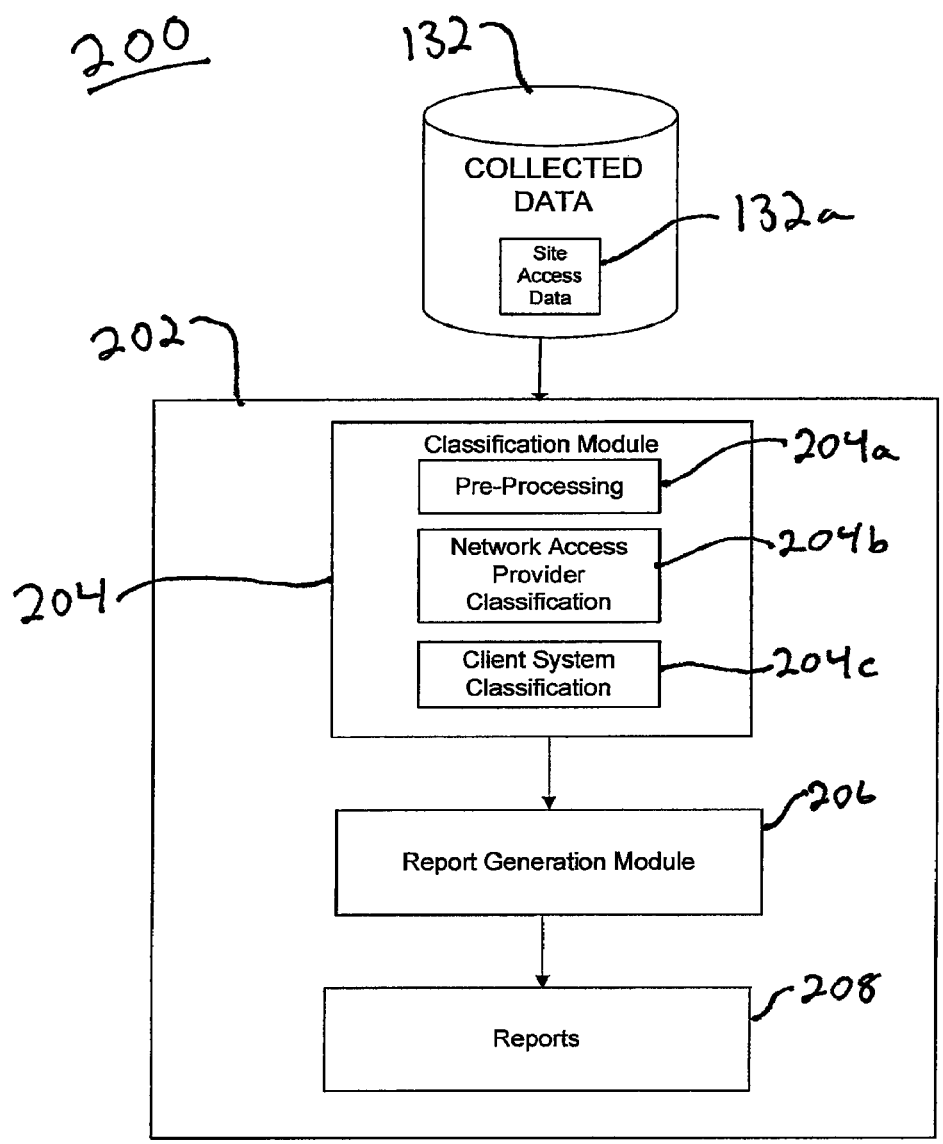
FIG. 2 illustrates an example of a system that can classify client systems using site access data and use the classifications with the site access data to generate measurement data segmented by one or more of the classes.

FIG. 2 illustrates an example of a system 200 that can be used to effectively classify client systems using site access data by classifying a unique identifier of the client system. These classifications can be used with the site access data to generate measurement data segmented by one or more of the classes.

The system 200 includes a reporting server 202. The reporting server 202 may be implemented using, for example, a general-purpose computer capable of responding to and executing instructions in a defined manner, a personal computer, a special-purpose computer, a workstation, a server, or a mobile device. The reporting server 202 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by the reporting server 202.

The reporting server 202 executes instructions that implement a classification module 204 and a report generation module 206. The classification module 204 includes a preprocessing module 204a, a network access provider classification module 204b, and a client system classification module 204c. The classification processor 204 may implement a process, such as that shown in FIG. 3, that accesses the site access data 132a from the database 132, and classifies client systems (represented by the unique identifier of the client system) into one of multiple classes based on this data. The report generation module 206 may use the site access data 132*a* and the classes of the client systems to generate one or more reports 208 that include information regarding client system accesses of one or more of resources, with the information being segmented according to one or more of the classes.

Figure 3:
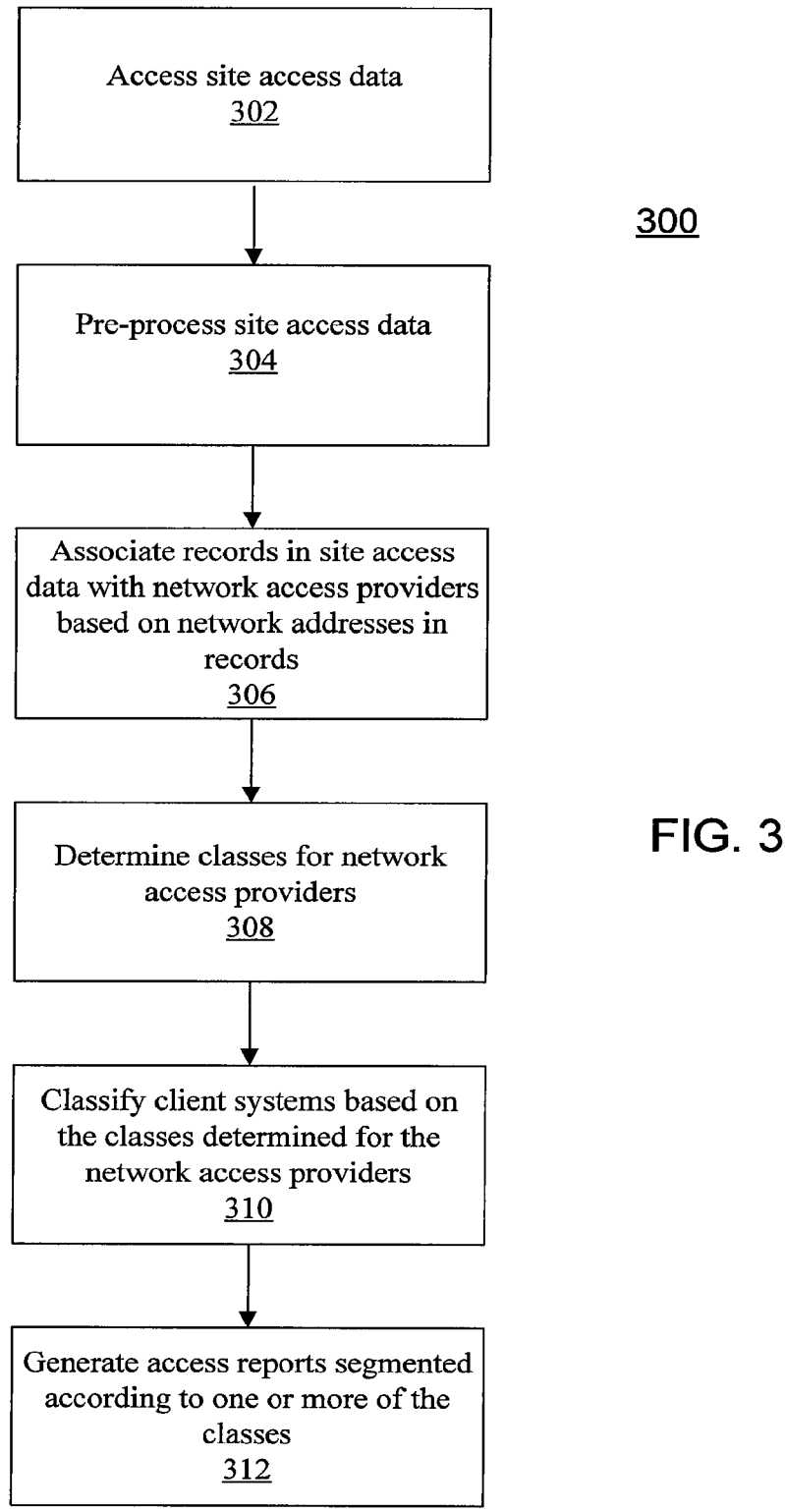
FIG. 3 is a flow chart illustrating an example of a process that may be performed to determine classes for client systems and generate access reports that are segmented by one or more of the client system classes.

FIG. 3 is a flow chart illustrating an example of a process 300 that may be performed to determine classes for client systems and generate access/usage reports that are segmented by one or more of the client system classes. In general, the network access providers used by the client systems to access the network are classified and a given client system's usage of one or more network access providers is then analyzed to assign one of multiple classes to the client system. The classes of the client systems can then be used to generate access/usage reports that are segmented by one or more of the classes associated with the client systems.

The following describes process 300 as being performed by the pre-processing module 204*a*, the network access provider classification module 204*b*, and the client system classification module 204*c*. However, the process 300 may be performed by other systems or system configurations. Furthermore, the following describes an example of a process that may be used when the reporting segments include work and home. However, other implementations may employ additional, or alternative, classes/reporting segments.

The pre-processing module 204*a* accesses the site access data 132*a* (302). As described above, the site access data is formed based on messages sent by client systems 102 as the client systems 102 access webpages that include beacon code, which results in messages being sent to the collection server 130. These messages indicate the webpage that was accessed and a unique identifier for the client system that sent the message. When a message is received at the collection server 130, a record may be generated for the received message. The record may indicate an identifier (e.g., the URL) of the webpage accessed by the client system, the unique identifier for the client system, a time at which the client system accessed the webpage (e.g., by including a time stamp of when the message was received as a proxy for the time the webpage was accessed), and a network address, such as an IP address, of the client system that accessed the webpage. The collection server 130 may then aggregate these records and store the aggregated records in the database 132 as site access data 132*a*.

As a result, the site access data 132*a* includes a set of records. Each of the records indicates an identifier of a resource that has been accessed by a client system, a network address of the client system that accessed the resource, a time that the client system accessed the resource, and a unique identifier for the client system that accessed the resource. The site access data 132*a* that is accessed by the pre-processing module may be site access data 132*a* that is aggregated for a certain, previous time period. For example, the accessed site access data 132*a* may be site access data 132*a* aggregated over the previous month.

The pre-processing module 204*a* performs one or more pre-processing functions on the accessed site access data 132*a* (304). For example, the pre-processing module 204*a* may match some or all of the URLs (or other identifiers of resources) in the records to patterns in a dictionary of the Internet, which may organize various different URLs into digital media properties, reflecting how the Internet companies operate their businesses. Each pattern may be associated with a web entity, which may be a webpage or collection of webpages that are logically grouped together in a manner that reflects how Internet companies operate their business. For example, the various webpages that are included in the finance.yahoo.com domain may be logically grouped together into a single web entity (e.g., Yahoo Finance). The pre-processing module 204*a* may associate a given record with the web entity associated with the pattern matching the URL in the record.

In addition, the pre-processing module 204*a* may remove certain records. For instance, records that reflect non-human initiated requests (e.g., requests made by a search index crawler or other robot) may be removed. In some implementations, records for certain types of client system devices may be removed. For instance, records for mobile devices may be remove. In some implementations, such records may be detected based on user agent data sent with the beacon message and recorded in the record. In addition, records may be removed for client systems not in a particular geographic area (e.g., if the reports are being generated for a particular geographic area, such as North America). The country and region of the client system corresponding to the record may be determined based on a reverse lookup of the network address (e.g., a reverse lookup of the IP address).

The network access provider classification module 204*b* associates records in the pre-processed site access data with network access providers based on the network addresses indicated by the records (306). For example, in one implementation in which the network addresses are IP addresses, a reverse IP lookup service may be used to obtain the network access provider to which the IP address is assigned. Furthermore, the reverse lookup may also provide additional information, such as the country (and region of the country) in which the client system is located.

The network access provider classification module 204*b* determines classes for the network access providers (308). The classes for the network access providers may be determined, for example, based on the records associated with the network access providers. For instance, in some implementations, the network access provider classification module 204*b* analyzes the times in records associated with a given network access provider to assess the number of accesses during one or more time periods. The network access provider classification module 204*b* uses the number of accesses during the one or more time periods to determine the class for that network access provider.

For example, to assess whether a network access provider is in the work class or the home class, the network access provider classification module 204*b* may evaluate the number of accesses from that network access provider that occur during a time period associated with a work time period (e.g., 9-5 pm, Mon-Fri) and the number of accesses from that network access provider that occur during a time period associated with a home time period (e.g., 6-10 pm, Mon-Fri). If the number of accesses during the work time is greater than the number of accesses during the home time period by a certain amount, then the network access provider may be classified in the work class, and vice versa.

In one implementation, for instance, the network access provider classification module 204*b* converts the times in the records to a local time based on the country and region information obtained by the reverse lookup. For each of the network access providers, the network access provider classification module 204*b* determines, based on the local time information, the average number of records during the work time period (e.g., the average number during the past month) and the average number of records during the home time period (e.g., the average over the past month). Based on the ratio between the average number of records during the work time period and the average number of records during the home time period, network access provider classification module 204b assigns the network access provider to the work class or the home class. For example, the network access provider may be classified in the home class if the ratio of the home time period to the work time period is greater than one, and instead be classified in the work class if this ratio is less than one.

In some implementations, some of the network access providers may be classified as work or home based on the names of the network access provider determined, for example, using a reverse lookup. For example, some network access providers may be known to be home providers or work providers and, accordingly, their names may be associated with a particular class.

Furthermore, some implementations may additionally (or alternatively) include other classes of network access providers. For instance, the classes may include shared use, hotels, or airports, 'large' corporations, 'small' companies. A shared use class may represent access providers that provide access to shared use client systems, such as those in libraries. A hotel or airport class may represent access providers that provide access at a hotel or airport, respectively. A large corporation or small company class may represent network access providers that are companies above a certain market capitalization or below a certain market capitalization, respectively, or that are otherwise divided into large and small based on particular criteria.

Techniques similar to those described above may be used to classify a network access provider into the other classes. For example, shared use client systems may be used most during a certain time period that is distinct from the time periods for work and home. In this case, if the accesses during a shared use time period are sufficiently greater than accesses during the work and home time period, the network access provider may be classified in the shared use class. In addition, some of the network access providers may be classified into any given class based on the names of the network access provider determined, for example, using a reverse lookup.

The client system classification module 204c classifies the client systems (e.g., using the unique identifier as a proxy) based on the classes determined for the network access providers (310). A given unique identifier is associated with one of the classes based on the classes of the network access provider(s) associated with the records that indicate the unique identifier. For example, if all of the records that indicate a given unique identifier are associated with a network access provider or providers that have a single class aligned with one of the reporting classes (e.g., all of the providers are classified as home, which is one of the reporting classes), then the unique identifier may be associated with that class (e.g., home).

A given unique identifier may be indicated in records associated with more than one network access provider. For example, if the client device is a laptop, then a user may use the laptop on different network access providers. In that case, the client system's usage of different classes of network access providers may be analyzed to determine which reporting class to assign to the client system.

For instance, if some of the records that indicate the unique identifier are associated with a network access provider in one class aligned with one of the reporting classes, while other records that indicate the unique identifier are associated with a network access provider in a different class that is aligned with another one of the reporting classes, then a decision algorithm may be applied to the records to determine which class to associate with the unique identifier. For example, if the number of records associated with the network access provider in one of the classes exceeds a threshold, then the corresponding unique identifier may be associated with that class. This may be used, for example, when the classes are home and work. When the number of records associated with network access providers in the work class exceeds a threshold, the unique identifier may be associated with the work class, even if some records are associated with network access providers in the home class. As another example, the class of the network access provider or providers associated with the most records for a given unique identifier may be associated with the unique identifier.

As a further example, if the records indicate the unique identifier is associated with network access providers that have classes not aligned with the reporting classes (either in addition or instead of providers with classes aligned with the reporting classes), the collective set or a subset of the classes and/or the usage pattern of those classes may be used to assign a reporting class to the client system. For example, if a client system is noted in a work class, home class, airport class, and hotel class, then it may be assumed that the client system is being used by someone who travels for work and therefore classified in the work class.

In some implementations, client system classification module 204c may perform additional processing to verify the class of a unique identifier. For example, the client system classification module 204c may analyze the records that indicate unique identifiers associated with the home class to insure those unique identifiers should continue to be classified as home. This may be used to identify small office/home office (SOHO) client systems. Such client systems may be provided network access by predominantly home network access providers. However, these machines are typically used primarily for business purposes, rather than home purposes and, accordingly, may properly be classified in the work class. The client system classification module 204 may use a process, such as process 400 described with respect to FIG. 4, to determine those unique identifiers associated with the home class that should instead be associated with the work class. The client system classification module 204c may then change the class associated with these unique identifiers appropriately.

The report generation module 206 can then generate reports with information about access of one or more of the resources (410). This information may be segmented according to one or more of the classes assigned to the client systems. For example, a report may be generated that shows the total page views for a web entity (described above) over the past month by client systems in the home class. To do so, for example, the report generation module 206 may access the pre-processed site access data and the information indicating which unique identifiers are associated with the home class. The report generation module 206 then may use this information to tally the records associated with the web entity and that indicate the unique identifiers associated with the home class. The report generation module 206 may create a similar report for total unique page views by only counting accesses by a given unique entity a single time.

The report generation module 206 may create similar reports for client systems in the work class, and may also do so for client systems in the shared use class, if desired. Also, the report generation module 206 may create reports with other information with respect to a webpage, group of webpages, or web entity, such as the frequency of access per client system and average number of pages viewed per client system. These reports can also be segmented according to one or more of the classes.

Figure 4:
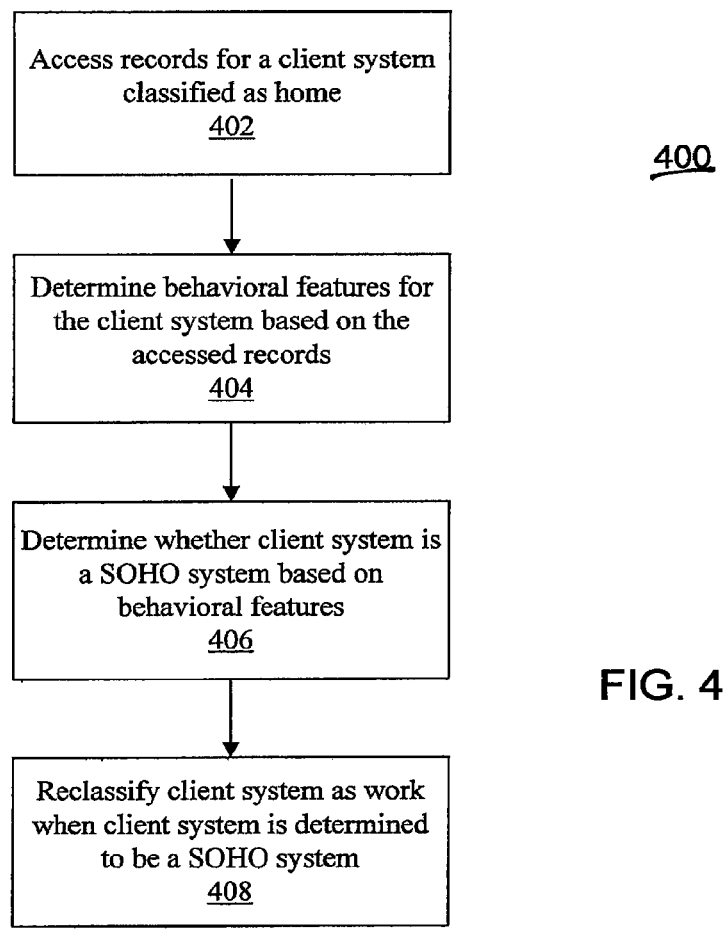
FIG. 4 is a flow chart illustrating a process that may be used to determine those client systems associated with a home class that should instead be associated with a work class.

FIG. 4 is a flow chart illustrating a process 400 that may be used to determine those client systems (represented by the unique identifiers) associated with the home class that should instead be associated with the work class. The following describes process 400 as being performed by the client system classification module 204c. However, the process 400 may be performed by other systems or system configurations.

To determine whether a given client system classified in the home class should be instead classified in the work class, the client system classification module 204c may access the records that indicate the unique identifier for the client system (402). Based on the accessed records, the client system classification module 204c determines behavioral features for the client (404). For example, the time of day the client system is most used, or other time of day usage patterns may be determined. Also, the types of websites accessed (e.g., news sites, stock sites, video game sites) and absolute or relative amount of access for each type may be determined and used as a behavioral feature. If classes of network access providers in addition, or as an alternative, to work and home are determined, the other classes and, potentially, the patterns of use of those other classes of network access providers may be determined and used as behavioral features.

The client system classification module 204c determines whether the client system is a SOHO system based on the behavioral features. For example, the client system classification module 204c may apply a set of heuristic rules to the behavioral features to determine whether the client system is a SOHO system.

Alternatively, or additionally, client system classification module 204c may use a machine learning classifier, such as a Bayesian or Support Vector Machine (SVM) classifier, to determine whether the client system is a SOHO system. The classifier may be trained using behavioral features for client systems known to be work systems and client systems known to be home systems. For instance, behavioral features of client systems previously determined to be work or home using the techniques described above may be used. Some of those client systems may erroneously be classified as home client systems because they are SOHO systems. However, the proportion of erroneously classified client systems may be small such that, in the aggregate, the behavioral features of the client systems classified as home client systems may accurately reflect the behaviors of those client systems that belong to the home class. As a result, the erroneously classified client systems may not have a significant impact on the training of the classifier.

The behavioral features determined based on the accessed records for the client system being assessed are input into the classifier. Based on the behavioral characteristics, the classifier generates an indication of whether the client system belongs to the work class or not, thereby indicating whether or not the client system is a SOHO system.

The client system classification module 204c reclassifies the client system into the work class if the client system is determined to be a SOHO system (408). For example, if the heuristic rules indicate that the client system is a SOHO system, the system classification module 204c associates the unique identifier with the work class instead of the home class. Similarly, as another example, if a machine learning classifier indicates the client system belongs to the work class, the client system classification module 204c associates the unique identifier with the work class instead of the home class.

In some implementations, the site access data, and associated classifications of unique identifiers/client systems in the site access data, may be used with panel data obtained from a panel of users to generate reports regarding the accesses of one or more resources. For example, as described further below, the panel data may be used to supplement the site access data when generating reports. Alternatively, or additionally, the site access data and associated classifications may be used to set weighting targets when determining projection weights for members of the panel.

Figure 5:
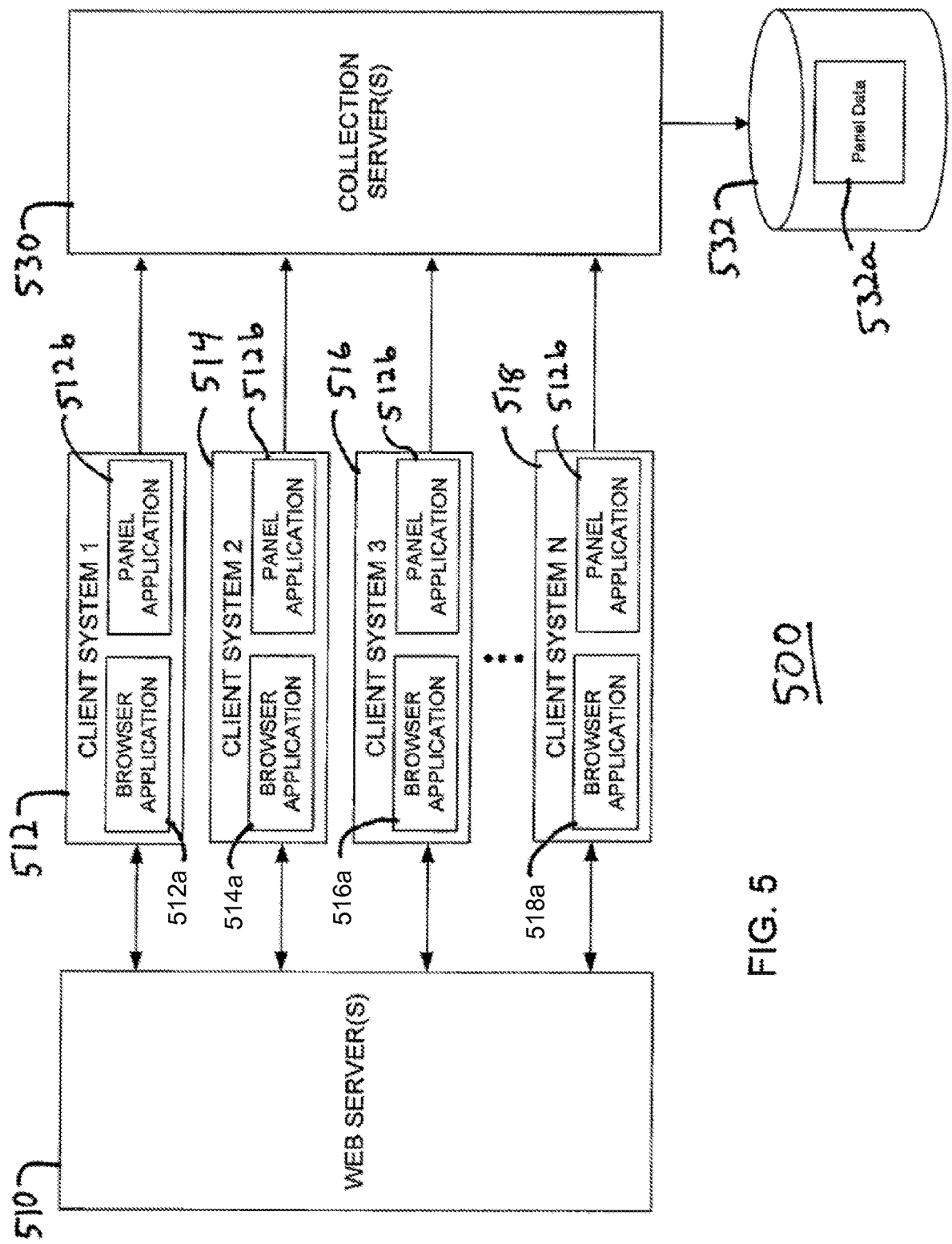
FIG. 5 illustrates an example of a system in which a panel of users may be used to obtain panel data for Internet audience measurement.

FIG. 5 illustrates an example of a system 500 in which a panel of users may be used to obtain panel data for audience measurement (e.g., Internet audience measurement). The system 500 includes client systems 512, 514, 516, and 518, one or more web servers 510, a collection server 530 (which may or may not be the same as collection server 130), and a database 532 (which may or may not be the same as database 132). In general, the users in the panel employ client systems 512, 514, 516, and 518 to access resources on the Internet, such as webpages, located at the web servers 510. Information about this resource access is sent by a panel application on each client system 512, 514, 516, and 518 to the collection server 530. This information may be used to understand the usage habits of the users of the Internet in conjunction with, or separately from, the site access data 132a.

Each of the client systems 512, 514, 516, and 518, the collection server 530, and the web servers 510 may be implemented using, for example, a general-purpose computer capable of responding to and executing instructions in a defined manner, a personal computer, a special-purpose computer, a workstation, a server, or a mobile device. Client systems 512, 514, 516, and 518, collection server 530, and web servers 510 may receive instructions from, for example, a software application, a program, a piece of code, a device, a computer, a computer system, or a combination thereof, which independently or collectively direct operations. The instructions may be embodied permanently or temporarily in any type of machine, component, equipment, or other physical storage medium that is capable of being used by a client system 512, 514, 516, and 518, collection server 530, and web servers 510.

In the example shown in FIG. 5, the system 500 includes client systems 512, 514, 516, and 518. However, in other implementations, there may be more or fewer client systems. Similarly, in the example shown in FIG. 5, there is a single collection server 530. However, in other implementations there may be more than one collection server 530. For example, each of the client systems 512, 514, 516, and 518 may send data to more than one collection server for redundancy. In other implementations, the client systems 512, 514, 516, and 518 may send data to different collection servers. In this implementation, the data, which represents data from the entire panel, may be communicated to and aggregated at a central location for later processing. The central location may be one of the collection servers.

The users of the client systems 512, 514, 516, and 518 are a group of users that are a representative sample of the larger universe being measured, such as the universe of all Internet users or all Internet users in a geographic region. To understand the overall behavior of the universe being measured, the behavior from this sample is projected to the universe being measured. The size of the universe being measured and/or the demographic composition of that universe may be obtained, for example, using independent measurements or studies. For example, enumeration studies may be conducted monthly (or at other intervals) using random digit dialing.

The users in the panel may be recruited by an entity controlling the collection server 530, and the entity may collect various demographic information regarding the users in the panel, such as age, sex, household size, household composition, geographic region, and household income. The techniques chosen to recruit users may be chosen or developed to help insure that a good random sample of the universe being measured is obtained, biases in the sample are minimized, and the highest manageable cooperation rates are achieved. Once a user is recruited, a monitoring application is installed on the user's client system to collect the information about the user's use of the client system to access resources on the Internet and to send that information to the collection server 530.

For example, the monitoring application may have access to the network stack of the client system on which the monitoring application is installed. The monitoring application may monitor network traffic to analyze and collect information regarding requests for resources sent from the client system and subsequent responses. For instance, the monitoring application may analyze and collect information regarding HTTP requests and subsequent HTTP responses.

Thus, in system 500, a monitoring application 512*b*, 514*b*, 516*b*, and 518*b*, also referred to as a panel application, is installed on each of the client systems 512, 514, 516, and 518. Accordingly, when a user of one of the client systems 512, 514, 516, or 518 employs, for example, a browser application 512*a*, 514*a*, 516*a*, or 518*a* to visit and view webpages, information about these visits may be collected and sent to the collection server 530 by the monitoring application 512*b*, 514*b*, 516*b*, and 518*b*. For instance, the monitoring application may collect and send to the collection server 530 the URLs of webpages or other resources accessed, the times those pages or resources were accessed, and an identifier associated with the particular client system on which the monitoring application is installed (which may be associated with the demographic information collected regarding the user or users of that client system). The collection server 530 receives and records this information. The collection server 530 aggregates the recorded information from the client systems and stores this aggregated information in the database 532 as panel data 532*a*.

The panel data 532*a* may be analyzed to determine the visitation or other habits of users in the panel, which may be extrapolated to the larger population of all Internet users. The information collected during a particular time period (session) can be associated with a particular user of the client system (and/or his or her demographics) that is believed or known to be using the client system during that time period. For example, the monitoring application may require the user to identify his or herself, or techniques such as those described in U.S. Patent Application No. 2004-0019518 or U.S. Pat. No. 7,260,837, both incorporated herein by reference, may be used. Identifying the individual using the client system may allow the usage information to be determined and extrapolated on a per person basis, rather than a per machine basis. In other words, doing so allows the measurements taken to be attributable to individuals across machines within households, rather than to the machines themselves.

To extrapolate the usage of the panel members to the larger universe being measured, some or all of the members of the panel are weighted and projected to the larger universe. In some implementations, a subset of all of the members of the panel may be weighted and projected. For instance, analysis of the received data may indicate that the data collected from some members of the panel may be unreliable. Those members may be excluded from reporting and, hence, from being weighted and projected.

The reporting sample (those included in the weighting and projection) are weighted to insure that the reporting sample reflects the demographic composition of the universe to be measured, and this weighted sample is projected to the universe. This may be accomplished by determining a projection weight for each member of the reporting sample and applying that projection weight to the usage of that member.

As described in U.S. Provisional Patent Application Ser. No. 61/175,941, titled "Determining Projection Weights Based On Census Data," which is incorporated herein in its entirety, the projection weight for each member may be determined by taking into account site access data collected by including beacon code in one or more webpages served by the web servers 510. In particular, the site access data may be used to set weighting targets when determining projection weights for the panel data.

As described in U.S. Provisional Patent Application Ser. No. 61/175,941, when using site access data (referred to therein as site centric data) to determine the projection weights for use with the panel data (referred to therein as panel centric data), it may be desirable to align the site access data with the panel data according to the home and work subpopulations. These two subpopulations can be identified in the panel in a similar fashion to demographic collection (e.g., through self-reporting).

Employing the techniques described in U.S. Provisional Patent Application Ser. No. 61/175,941, the records from the site access data that are associated with the home class may be used to set the weighting targets for those members in the panel using home client systems, and these weighting targets may be used to determine the projection weights for members in the home subpopulation. Similarly, employing the techniques described in U.S. Provisional Patent Application Ser. No. 61/175,941, the records from the site access data that are associated with the work class may be used to set the weighting targets for those members in the panel using work client systems, and these weighting targets may be used to determine the projection weights for members in the work subpopulation.

The usage behavior of the weighted and projected sample (either collectively or segmented by home and work subpopulations) is then considered a representative portrayal of the behavior of the defined universe. Behavioral patterns observed in the weighted, projected sample are assumed to reflect behavioral patterns in the universe.

Reports can be generated from this information. For example, this data may be used to estimate the number of unique visitors visiting certain webpages or groups of webpages, or unique visitors within a particular demographic visiting certain webpages or groups of webpages. This data may also be used to determine other estimates, such as the frequency of usage per user, average number of pages viewed per user, and average number of minutes spent per user. These reports may be segmented by classes, such as work and home.

Regardless of whether site access data is used to determine the projection weights, the projected sample (either collectively or segmented by home and work subpopulations) may be employed with the site access data when generating reports. For example, the projected sample may be used to generate estimates regarding client system access of webpages that do not employ the beacon code, while the site access data is employed to generate estimates for those webpages using the beacon code. This may be employed, for instance, to generate a report regarding a particular web entity when some webpages that are part of the web entity employ the beacon code, while other webpages that are part of the web entity do not.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Processes can be performed by one or more programmable processors executing a computer program to perform functions of the processes by operating on input data and generating output. Processes can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The general elements of a computer are a processor for executing instructions and one or more memory devices for storing instructions and data. A computer may also include, or be operatively coupled to receive data from or transfer data to, or both, one or more mass storage devices for storing data, such as, magnetic, magneto-optical disks, or optical disks. Information carriers suitable for embodying computer program instructions and data include all forms of volatile or non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made. For example, useful results still could be achieved if steps of the disclosed techniques were performed in a different order and/or if components in the disclosed systems were combined in a different manner and/or replaced or supplemented by other components.

Accordingly, other implementations are within the scope of the following claims.

What is claimed is:

1. A method, comprising:
    receiving, in response to each access of a webpage by a plurality of client systems, a Uniform Resource Locator (URL) of the accessed webpage, a network address of a client system of the plurality of client systems, and a time that the client system accessed the webpage to generate a record of access to the webpage;
    identifying a network access provider for each record of access to the webpage based at least on the network address of the client system;
    aggregating a plurality of records generated for accesses to webpages for a single network access provider;
    determining a first number of the aggregated records that include a time of access during a first time period associated with a first class;
    determining a second number of the aggregated records that include a time of access during a second time period associated with a second class, the second time period being different from the first time period;
    comparing the first number to the second number;
    assigning, based on the comparison of the first number to the second number, the single network access provider to the first class or the second class;
    assigning each client device accessing the network using the single network access provider with the same class as the single network access provider; and
    generating a report for at least a portion of accesses to the webpages based on the class of the client devices.

2. The method of claim 1, wherein assigning the single network access provider to the first class or the second class comprises assigning the single network access provider to a home class or a work class based on the comparison of the first number to the second number.

3. The method claim 2, wherein assigning each client device accessing the network using the single network access provider with the same class as the single network access provider comprises assigning each client device accessing the network using the single network access provider as a home client device or a work client device.

4. The method of claim 3, wherein generating the report for the at least portion of accesses to the webpages based on the class of the client devices comprises generating the report for all accesses to the webpages from a home client device.

5. The method of claim 3, wherein generating the report for the at least portion of accesses to the webpages based on the class of the client devices comprises generating the report for all accesses to the webpages from a work client device.

6. The method of claim 3, wherein generating the report for the at least portion of accesses to the webpages based on the class of the client devices comprises generating the report for all accesses to the webpages grouped by the class of the accessing device.

7. The method of claim 1, wherein:
    comparing the first number to the second number comprises determining that the first number is greater than the second number; and
    assigning the single network access provider comprises assigning the single network access provider to the first class based on the determination that the first number is greater than the second number.

8. The method of claim 1, wherein:
    comparing the first number to the second number comprises determining that the second number is greater than the first number; and assigning the single network access provider comprises assigning the single network access provider to the second class based on the determination that the second number is greater than the first number.

9. The method of claim 1, wherein the first class is a work class, the first time period is working hours, the second class is a home class, and the second time period is all hours outside of working hours.

10. The method of claim 1, wherein generating the report for the at least portion of accesses to the webpages based on the class of the client devices comprises excluding records associated with a particular class of client devices in the generated report.

11. The method of claim 1, wherein aggregating the plurality of records generated for accesses to the webpages for the single network access provider comprises removing records received outside of one or more geographical areas.

12. The method of claim 1, wherein aggregating the plurality of records generated for accesses to the webpages for the single network access provider comprises removing records received in response to non-human initiated accesses to the webpages.

13. The method of claim 1, wherein aggregating the plurality of records generated for accesses to the webpages for the single network access provider comprises associating a plurality of received URLs with a domain and aggregating the plurality of records generated for accesses to the webpages of the domain for the single network access provider.

14. The method of claim 1, wherein receiving the URL of the accessed webpage, the network address of the client system, and the time that the client system accessed the webpage comprises receiving the URL of the accessed webpage, the network address of the client system, and the time that the client system accessed the webpage from the client device executing a beacon included on the webpage.

15. The method of claim 1, wherein identifying the network access provider for each record of access to the webpage is based at least on the network address of the client system and the time that the client system accessed the webpage.

16. The method of claim 1, further comprising receiving a unique identifier of the client system, wherein the unique identifier of the client system is included in a cookie stored on the client system.

17. The method of claim 1, wherein the network address of the client system is an Internet Protocol (IP) address of the client system.

18. A system comprising:
one or more processors;
one or more storage devices storing instructions that, when executed by the one or more processors, cause the one or more processors to:
receive, in response to each access of a webpage by a plurality of client systems, a Uniform Resource Locator (URL) of the accessed webpage, a network address of a client system of the plurality of client systems, and a time that the client system accessed the webpage to generate a record of access to the webpage;
identify a network access provider for each record of access to the webpage based at least on the network address of the client system;
aggregate a plurality of records generated for accesses to webpages for a single network access provider;
determine a first number of the aggregated records that include a time of access during a first time period associated with a first class;
determine a second number of the aggregated records that include a time of access during a second time period associated with a second class, the second time period being different from the first time period;
compare the first number to the second number;
assign, based on the comparison of the first number to the second number, the single network access provider to the first class or the second class;
assign each client device accessing the network using the single network access provider with the same class as the single network access provider; and
generate a report for at least a portion of accesses to the webpages based on the class of the client devices.

19. A storage devices storing instructions that, when executed by one or more processors, cause the one or more processors to:
receive, in response to each access of a webpage by a plurality of client systems, a Uniform Resource Locator (URL) of the accessed webpage, a network address of a client system of the plurality of client systems, and a time that the client system accessed the webpage to generate a record of access to the webpage;
identify a network access provider for each record of access to the webpage based at least on the network address of the client system;
aggregate a plurality of records generated for accesses to webpages for a single network access provider;
determine a first number of the aggregated records that include a time of access during a first time period associated with a first class;
determine a second number of the aggregated records that include a time of access during a second time period associated with a second class, the second time period being different from the first time period;
compare the first number to the second number;
assign, based on the comparison of the first number to the second number, the single network access provider to the first class or the second class;
assign each client device accessing the network using the single network access provider with the same class as the single network access provider; and
generate a report for at least a portion of accesses to the webpages based on the class of the client devices.

20. The method of claim 1, wherein:
the first time period associated with the first class has a first start time and a first end time that is after the first start time; and
the second time period associated with the second class has a second start time and a second end time that is after the second start time.

* * * * *